United States Patent [19]  [11] 4,093,119
Swisher  [45] June 6, 1978

[54] ACCESSORY HEATING DEVICE FOR TRACTORS AND SIMILAR EQUIPMENT

[76] Inventor: Edmund Swisher, 670 Upper River Rd., Gallipolis, Ohio 45631

[21] Appl. No.: 794,835

[22] Filed: May 9, 1977

[51] Int. Cl.² ............................ B60H 3/00; B60H 1/02
[52] U.S. Cl. .................................. 237/12.3 A; 98/2.05; 98/2.11; 180/54 A
[58] Field of Search ............... 237/12.3 R, 12.3 A; 98/2, 2.05, 2.08, 2.11; 165/51; 123/142.5; 180/54 A

[56] References Cited

U.S. PATENT DOCUMENTS

| 1,257,219 | 2/1918 | Griswold | 237/12.3 A |
| 1,325,054 | 12/1919 | Stout | 237/12.3 A |
| 2,240,062 | 4/1941 | Welch | 237/12.3 A |
| 2,920,829 | 1/1960 | Shane | 237/12.3 A |
| 3,155,318 | 11/1964 | Kirkham | 98/2.05 |
| 3,669,203 | 6/1972 | Honda | 180/54 A |
| 3,924,524 | 12/1975 | Whisler | 98/2.11 |

Primary Examiner—John J. Camby
Assistant Examiner—Henry C. Yuen

[57] ABSTRACT

An accessory heating device for a tractor and similar equipment includes a heater housing having a base, a rear wall with an opening therethrough, a pair of sidewalls, a front wall with an opening therethrough, a top with a hole therethrough, and a chamber therein. A filter member is insertable into the chamber through a slotted opening in one of the sidewalls. The rear wall of the heater housing is mounted onto a forward wall of a radiator housing of the tractor. A plurality of vane elements are disposed transversely across the opening in the front wall, wherein each vane element can be opened or closed to allow cool air into the chamber. An annularly shaped sleeve is affixed onto an upper surface of the top around the hole. One end of a flexible conduit is mounted onto the sleeve, wherein the other end of the conduit is joined in a fluid serial connection to an air register in the operator's compartment of the tractor.

6 Claims, 3 Drawing Figures

ACCESSORY HEATING DEVICE FOR TRACTORS AND SIMILAR EQUIPMENT

BACKGROUND OF THE INVENTION

Variously designed accessory heating systems have been employed for tractors and similar equipment, but these heating systems have been of the type wherein they must be in the fully opened position or detached from the equipment altogether. These patents are non-applicable to my present invention. These U.S. Patents are Nos.: 2,175,280 To Paton; 2,302,416 to Brooks; 2,584,329 to Clapper; 2,763,196 to Singleton; 2,902,829 to Shane; 3,155,318 to Kirkham; 3,304,004 to Hraboweckji; and 3,501,095 to Peterson.

SUMMARY OF THE INVENTION

My present invention relates to a heating device for a tractor which can deliver temperature controlled, dust free air to an operator's compartment of the tractor.

An object of my present invention is to provide an accessory heating device for tractors and similar equipment constructed in a manner such that it may be readily attached to substantially all popular models of tractors, bulldozers, and similar equipment.

Another object of my present invention is to provide an accessory heating system constructed in such a manner that the operator of the equipment may easily vary the amount of heated air entering the operator's compartment.

Another object of my present invention is to provide an accessory heating device that will not require removal when its use is not required.

A further object of my invention is to provide an accessory heating device with a removable air filter.

Briefly, my present invention includes a heater housing having a base, a rear wall with an opening therethrough, a pair of sidewalls, a front wall with an opening therethrough, a top with a hole therethrough and a chamber therein. A filter member is insertable into the chamber through a slotted opening in one of the sidewalls. The rear wall of the heater housing is mounted onto a forward wall of a radiator housing of the tractor. A plurality of vane elements are disposed transversely across the opening in the front wall, wherein each vane element can be opened or closed to allow cool air into the chamber. An annularly shaped sleeve is affixed onto the upper surface of the top around the hole. One end of a flexible conduit is mounted onto the sleeve and the other end of the flexible conduit is in a serial fluid connection with an air register disposed in the operator's compartment of the tractor.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
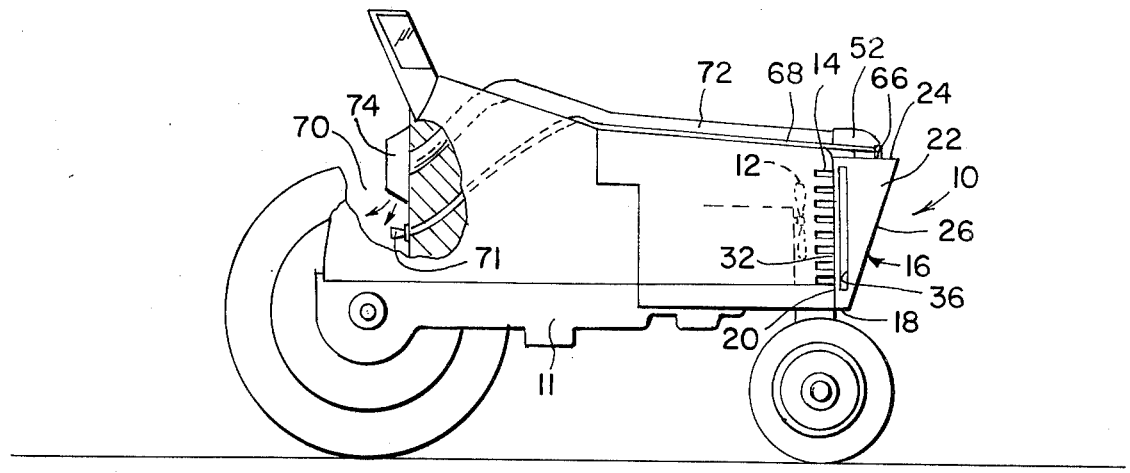
FIG. 1 illustrates a fragmentary side view of an accessory heating device mounted on a tractor.
Figure 2:
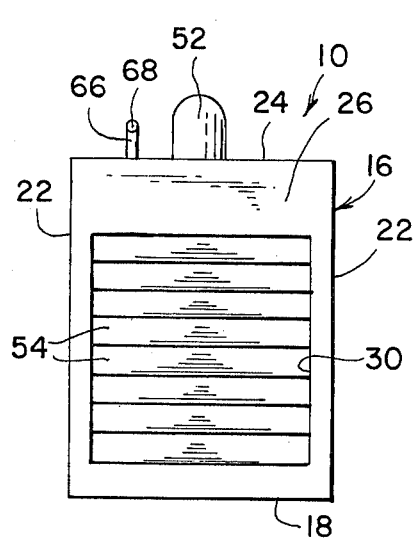
FIG. 2 illustrates a front view of the device.
Figure 3:
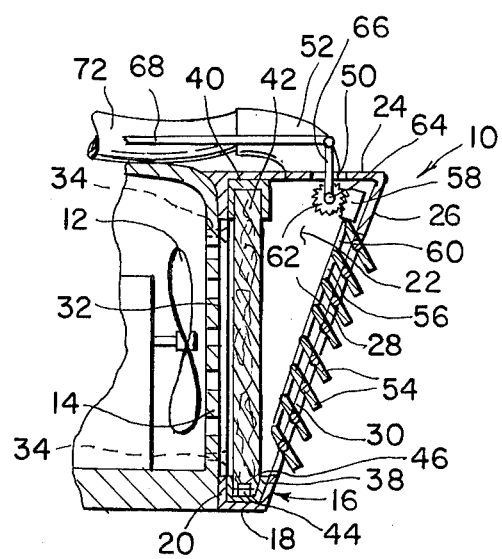
FIG. 3 is a side cross-sectional view of the device mounted on the tractor.

Turning now descriptively to the drawings, in which similar reference characters denote similar elements throughout the several views, FIGS. 1-3 show an accessory heating device 10 which is removably received onto a conventional form of a tractor 11 although the invention is adaptable to similar heavy equipment having a conventional fan 12 and a radiator assembly 14. The device 10 generally comprises a housing 16 having a base 18, an upwardly extending vertical rear wall 20 with a large opening therethrough, a pair of upwardly extending sidewalls 22, a top 24, and upwardly extending slanted front wall 26, and a chamber 28 therein, wherein wall 26 slants upwardly and forwardly from base 18 to top 24 and wall 26 has a large opening 30 therethrough. The rear wall 20 is vertically disposed on a front vertical wall of the radiator housing 32 of the tractor 11 by screw mounting means 34 extending through the rear wall 20 into the housing 32. One of the sidewalls 22 has a vertically aligned slotted opening 36 therethrough. A first channel shaped guide element 38 is affixed transversely onto the upper surface of base 18 and a second channel shaped guide element 40 is affixed transversely onto the lower surface of top 24, wherein elements 38, 40 are aligned with opening 36. A rectangularly shaped filter member 42 inserts through opening 36 into chamber 28 and is disposed at its upper and lower edges within elements 38, 40 thereby maintaining it in a vertical alignment within the chamber 28. A deformable male snap element 44 is disposed on the upper surface of channel element 38, wherein element 44 is removably snapped into a female snap element 46 disposed in the lower edge of filter member 42 thereby locking filter member 42 in place. The top 24 of housing 16 has a hole 50 therethrough, wherein an annularly shaped sleeve element 52 is affixed onto the upper surface around hole 50. A plurality of vane elements 54 are pivotably mounted within opening 30 of front wall 26, wherein each vane element 54 extends transversely across opening 30 and the vane elements 54 extend from the bottom to the top of the opening 30. The ends of each vane element 54 are journaled for rotation in the front wall 26 along the sides of the opening 30. An upwardly extending rod element 56 is disposed in the chamber 28, wherein each vane element 54 is pivotally joined to rod element 56 in a conventionally styled shutter arrangement. A rack gear 58 is mounted linearly onto the upper end 60 of rod element 56. A pinion gear 62 is disposed in an upper portion of chamber 28, wherein gear 62 meshes with rack gear 58. The pinion gear 62 is mounted on a horizontally placed rod 64, wherein the ends of rod 64 are journaled for rotation in sidewalls 22 and the pinion gear 62 has an internal spring element (not shown) which returns the vane elements 54 to a normally closed position thereby preventing air from entering chamber 28 through opening 30. A lever arm 66 is affixed onto rod 64 and extends upwardly therefrom. As lever arm 66 is moved, rod 64 rotates, causing gear 62 to rotate thereby moving gear 58 and rod element 56 so as to cause vane elements 54 to open. One end of a cable element 68 is affixed to lever arm 66, wherein cable element 68 extends to the operator's compartment 70 of the tractor 11, wherein the other end of cable element 68 is affixed to a conventional cable control means 71 such as a pull type knob. One end of a flexible conduit 72 is affixed onto sleeve element 52 and the other end of conduit 72 is joined in a fluid serial connection to an air register 74 disposed in the operator's compartment 70.

In operation, air is urged forwardly through radiator 14 by fan 12, wherein the heated air passes through the filter member 42 into chamber 28. The heated air upon reaching vane elements 54 is either unimpeded in its passage to the atmosphere, if the vane elements 54 are open, or selectively throttled or blocked entirely depending on the degree of openness of vanes 54. In the latter two instances the warm air passes through conduit 72 from chamber 28 to the operator's compartment. The temperature of the warm air being dependent upon the volume of air entering through the open vane elements 54.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An accessory heating device for a tractor and similar equipment mounted onto a forward wall of a radiator housing having a radiator assembly and a fan, which comprises:
   (a) a heater housing having a base, a rear wall with a large opening therethrough, a pair of sidewalls, a front wall with a large opening therethrough, a top with a hole therethrough, and a chamber therein, wherein one of said sidewalls has a vertically aligned slotted opening therethrough;
   (b) means for mounting said rear wall of said heater housing against said forward wall of said radiator housing;
   (c) a filter member insertable through said slotted opening into said chamber;
   (d) a plurality of vane elements transversely disposed across said opening of said front wall, each said vane elements rotatably disposed within said opening, said plurality of said vane elements extending from a bottom to a top of said opening;
   (e) means for maintaining said filter element in a vertical alignment within said chamber;
   (f) means for opening and closing said vane elements within said opening;
   (g) an annularly shaped sleeve affixed to an upper surface of said top of said heater housing around said hole in said top; and
   (h) one end of a flexible conduit mounted onto said sleeve member, another end of said flexible conduit adapted to be mounted in a serial fluid connection to an air register disposed in an operator's compartment of said tractor.

2. A device according to claim 1, wherein said mounting means for said rear wall is a plurality of screw means extending through said rear wall of said heater housing into said forward wall of said radiator housing.

3. A device according to claim 1, wherein said maintaining means further includes:
   (a) a first channel guide element mounted onto an upper surface of said base; and
   (b) a second channel guide element mounted onto a lower surface of said top, an upper end of said filter removably received into said second guide element, and a lower end of said filter removably received into said first guide element.

4. A device according to claim 3, further including:
   (a) a deformable male snap element disposed in said first channel guide element;
   (b) a female snap element disposed in said lower end of said filter, said male snap element removably received into said female snap element thereby locking said filter in position.

5. A device according to claim 4, wherein said opening and closing means further includes:
   (a) a vertically aligned rod disposed in said chamber, each of said vane elements pivotally joined to said rod;
   (b) a rack gear disposed on an upper end of said rod;
   (c) a pinion gear mounted for rotation on an axle rod in said chamber, said pinion gear meshing with said rack gear;
   (d) a lever arm mounted on said axle rod;
   (e) one end of a cable element affixed to said lever arm; and
   (f) a cable control means disposed in said operator's compartment, another end of said cable element communicating with said cable control means.

6. A device according to claim 5, wherein said front wall slants forwardly and upwardly from said base to said top.

* * * * *